US009098776B2

(12) United States Patent
Iio et al.

(10) Patent No.: US 9,098,776 B2
(45) Date of Patent: Aug. 4, 2015

(54) INFORMATION PROCESSING APPARATUS AND INFORMATION PROCESSING METHOD THAT DETERMINE WHETHER ANY ONE OF A PLURALITY OF PIXELS IN AN OBTAINED PARTIAL IMAGE HAS AN INVALID VALUE TO SELECT AN APPROPRIATE ACQUISITION METHOD

(71) Applicant: CANON KABUSHIKI KAISHA, Tokyo (JP)

(72) Inventors: Yuichiro Iio, Kawasaki (JP); Yusuke Mitarai, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 175 days.

(21) Appl. No.: 13/861,060

(22) Filed: Apr. 11, 2013

(65) Prior Publication Data

US 2013/0279814 A1 Oct. 24, 2013

(30) Foreign Application Priority Data

Apr. 19, 2012 (JP) ................................. 2012-096036

(51) Int. Cl.
*G06K 9/00* (2006.01)
*G06K 9/62* (2006.01)

(52) U.S. Cl.
CPC .................... *G06K 9/6267* (2013.01)

(58) Field of Classification Search
None
See application file for complete search history.

(56) References Cited

U.S. PATENT DOCUMENTS

| 6,009,199 A | 12/1999 | Ho | |
|---|---|---|---|
| 6,351,561 B1 * | 2/2002 | Iyengar | 382/226 |
| 2010/0232686 A1 * | 9/2010 | Dewan et al. | 382/159 |
| 2010/0266179 A1 * | 10/2010 | Ramsay et al. | 382/131 |
| 2011/0158535 A1 * | 6/2011 | Iio et al. | 382/190 |
| 2011/0229020 A1 * | 9/2011 | Yoshii et al. | 382/159 |

OTHER PUBLICATIONS

Lepetit et al., "Keypoint Recognition using Randomized Trees," IEEE Transactions on Pattern Analysis and Machine Intelligence (2006), pp. 1465-1479.
Fujiyosji, Hironobu, "Object Detection by Joint Feature Based on Relations of Local Features," Technical Report of IEICE, vol. 108, No. 484, PRMU 2008-247, Mar. 2009, pates 43-54.
Özuysal et al., "Fast Keypoint Recognition using Random Ferns," IEEE Transactions on PAMI, vol. 32, No. 3, 2010, pp. 448-461.
Brieman, et al., "Classification and Regression Trees," Chapman & Hall/CRC (1984), pp. 20-27, 36-39, and 228-233.

* cited by examiner

*Primary Examiner* — Vu Le
*Assistant Examiner* — Alexander J Lesnick
(74) *Attorney, Agent, or Firm* — Fitpatrick, Cella, Harper & Scinto

(57) ABSTRACT

An information processing apparatus including an acquisition unit that acquires a plurality of image sets obtained by different acquisition methods, a generation unit that generates partial image sets by extracting corresponding partial images from respective images of the image sets, an assignment unit that assigns the partial image sets to a root node of a tree structure, a setting unit that sets, at each node of the tree structure, positions of a plurality of pixels for each partial image set assigned to the node, a determination unit that determines whether any one of the plurality of pixels in a. partial image obtained by a predetermined one of the different acquisition methods in each partial image set has an invalid value, and a selection unit that selects art acquisition method based on the determination.

9 Claims, 11 Drawing Sheets

INFORMATION PROCESSING APPARATUS AND INFORMATION PROCESSING METHOD THAT DETERMINE WHETHER ANY ONE OF A PLURALITY OF PIXELS IN AN OBTAINED PARTIAL IMAGE HAS AN INVALID VALUE TO SELECT AN APPROPRIATE ACQUISITION METHOD

BACKGROUND OF THE INVENTION

1. Field of the Invention

The present invention relates to a technique of analyzing a new pattern based on a pattern learned in advance.

2. Description of the Related Art

There is conventionally a machine learning technique of analyzing a new pattern using a learning pattern. A pattern recognition method called a classification tree or a decision tree (non-patent literature 1 (Leo Breiman, Jerome Friedman, Charles J. Stone, and R. A. Olshen, "Classification and Regression Trees", Chapman & Hall/CRC (1984))) has been proposed and used in many systems. This method is characterized by being able to quickly analyze a pattern using a tree structure and has shown its capability in the days of computers of poor performance.

Note that when the pattern recognition problem is regarded as a pattern identification problem, the type of the pattern to be identified is called "class". In the following explanation, the term "class" will be used in this sense.

A drawback of the classical classification tree or decision tree as described in non-patent literature 1 is the relatively low recognition performance. To overcome this drawback, a method using a set (ensemble) of classification trees is proposed in, for example, patent literature 1 (U.S. Pat. No. 6,009, 199). In this technique, L (L is a constant of 2 or more and normally ranges from 10 to 100) classification trees are created, and all the classification trees are used to implement higher recognition performance.

Non-patent literature 2 (Vincent Lepetit and Pascal Fua, "Keypoint Recognition Using Randomized Trees", IEEE Transactions on Pattern Analysis and Machine Intelligence (2006), pp. 1465-1479) discloses an example in which the method using a set (ensemble) of classification trees is applied to a computer vision. In this paper, the authors use a (32 pixels×32 pixels) image and create a classification tree based on the luminance values. More specifically, two points on the (32 pixels×32 pixels) image are selected at random at each node of the classification tree, and the luminance values of the pixels are compared, thereby implementing branch. The paper reports that this processing can be executed at a very high speed, and the recognition accuracy is sufficiently high.

In general, using data acquired by a plurality of methods enables to perform identification more accurately than recognition using single data, as is known. For example, non-patent literature 3 ("Object Detection by Joint Feature Based on Relations of Local Features", Technical Report of IEICE, vol. 108, no. 484, PRMU 2008-247, pp. 43-54, March, 2009) describes that in object detection from a moving image using joint features, images obtained by sensing an identification target at different resolutions, luminance images, space-time information, range information, and the like are combined, thereby improving the accuracy of detecting a human or a vehicle.

However, when applying the identification using data obtained by a plurality of acquisition methods to identification using classification trees, creating the classification trees comprehensively applied to the images obtained by all acquisition units is not realistic because of the enormous size. For example, when performing recognition using a luminance image and a range image, classification trees of $2^3$=8 patterns are created, as compared to one classification tree created to create a two-stage binary tree and perform recognition using only a luminance image.

SUMMARY OF THE INVENTION

The present invention has been made in consideration of this problem, and provides a technique of preventing an increase in the size caused by explosion of branch patterns, implementing an execution speed close to that when using data acquired by a single acquisition form, and enabling more accurate classification.

According to the first aspect of the present invention, an information processing apparatus comprises: an acquisition unit that acquires a plurality of image sets obtained by different acquisition methods; a generation unit that generates partial image sets by extracting corresponding partial images from respective images of the image sets; a first assignment unit that assigns the partial image sets generated by the generation unit to a root node of a tree structure; a selection unit that sets, at each node of the tree structure, positions of a plurality of pixels for each partial image set assigned to the node and selects one of the different acquisition methods based on pixel values of the set positions in each partial image set; a second assignment unit that assigns each partial image set assigned to each node to one of lower nodes based on the pixel values of the set positions in the partial images acquired by the acquisition method selected by the selection unit; and an output unit that outputs information about the set assigned to an end node of the tree structure.

According to the second aspect of the present invention, an information processing method performed by an information processing apparatus, comprises: an acquisition step of acquiring a plurality of image sets obtained by different acquisition methods; a generation step of generating partial image sets by extracting corresponding partial images from respective images of the image sets; a first assignment step of assigning the partial image sets generated in the generation step to a root node of a tree structure; a selection step of setting, at each node of the tree structure, positions of a plurality of pixels for each partial image set assigned to the node and selecting one of the different acquisition methods based on pixel values of the set positions in each partial image set; a second assignment step of assigning each partial image set assigned to each node to one of lower nodes based on the pixel values of the set positions in the partial images acquired by the acquisition method selected in the selection step; and an output step of outputting information about the set assigned to an end node of the tree structure.

Further features of the present invention will become apparent from the following description of exemplary embodiments with reference to the attached drawings.

DESCRIPTION OF THE EMBODIMENTS

The embodiments of the present invention will now be described with reference to the accompanying drawings. Note that the embodiments to be described below are examples of detailed implementation of the present invention or detailed examples of the arrangement described in the appended claims.

[First Embodiment]

This embodiment aims at identifying a recognition target by efficiently using input images including the recognition target acquired by a plurality of acquisition methods. Examples of the input images acquired by the plurality of acquisition methods are a luminance image obtained by a general optical apparatus and a range image obtained by an existing distance measuring method. The input images acquired by the plurality of acquisition methods also include, for example, luminance images and the like sensed under different illumination patterns.

In the following description, the image acquisition method or image acquisition situation will be referred to as a channel. In this embodiment, a case in which images of two channels, that is, a luminance image and a range image are used will be described.

Figure 1:
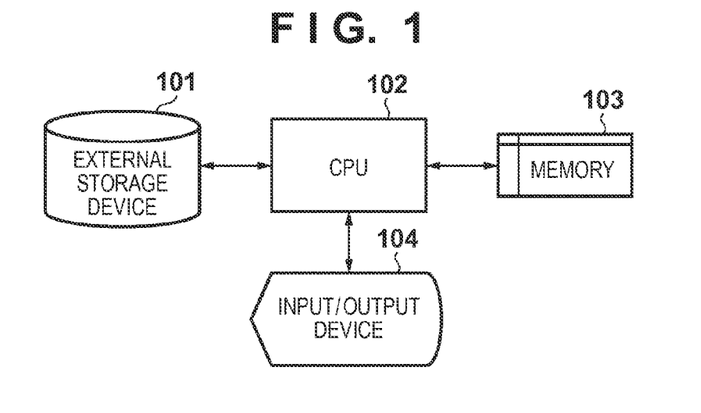
FIG. 1 is a block diagram showing an example of the functional arrangement of an information processing apparatus.

An example of the hardware arrangement of an information processing apparatus according to this embodiment will be described first with reference to the block diagram of FIG. 1. The arrangement shown in FIG. 1 is merely an example, and any other arrangement can be employed as long as it can execute each processing to be described below.

A CPU 102 controls the operation of the entire information processing apparatus using computer programs and data stored in a memory 103 and also executes processing to be described later as processing to be executed by the information processing apparatus. The memory 103 is formed from a RAM, a ROM, or the like, and has an area to temporarily store computer programs and data loaded from an external storage device 101 and an area to temporality store various kinds of data input via an input/output device 104.

The memory 103 also has a work area used by the CPU 102 to execute various kinds of processing. That is, the memory 103 can provide various kinds of areas as needed.

The external storage device 101 is a mass information storage device represented by a hard disk drive. The external storage device 101 stores an OS (Operating System), and computer programs and data used to cause the CPU 102 to execute each processing to be described later as processing to be executed by the information processing apparatus. In addition, various kinds of data input via the input/output device 104 can be saved in the external storage device 101. The computer programs and data saved in the external storage device 101 are loaded to the memory 103 under the control of the CPU 102 and processed by the CPU 102.

The input/output device 104 functions as the data input/output interface of the information processing apparatus. For example, the input/output device 104 can be an image sensing device for sensing a recognition target, or a device for inputting an image obtained by sensing a recognition target from a memory that holds the image to the information processing apparatus. The input/output device 104 may be an operation unit used by the user to input various kinds of instructions to the information processing apparatus (CPU 102). The input/output device 104 may be a device for externally transmitting various kinds of data (data representing a recognition result and data of a tree structure) generated by the information processing apparatus. The input/output device 104 may be an aggregate including at least one of the above-described devices, as a matter of course.

The user sometimes inputs, via the input/output device 104, a trigger to execute a computer program for implementing each processing to be described below. The user may view a result or controls the parameters of the computer programs via the input/output device 104. The result is not always output to a human (user) and may be output to a machine such as an apparatus for controlling, for example, a robot.

Figure 2A:
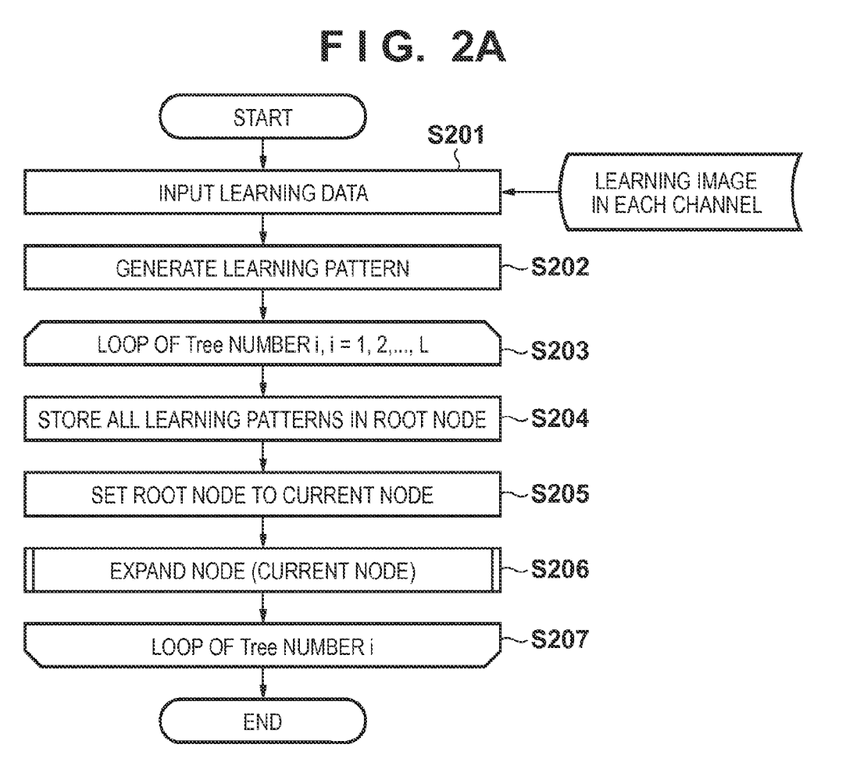
FIG. 2A is a flowchart of processing of a learning process.
Figure 2B:
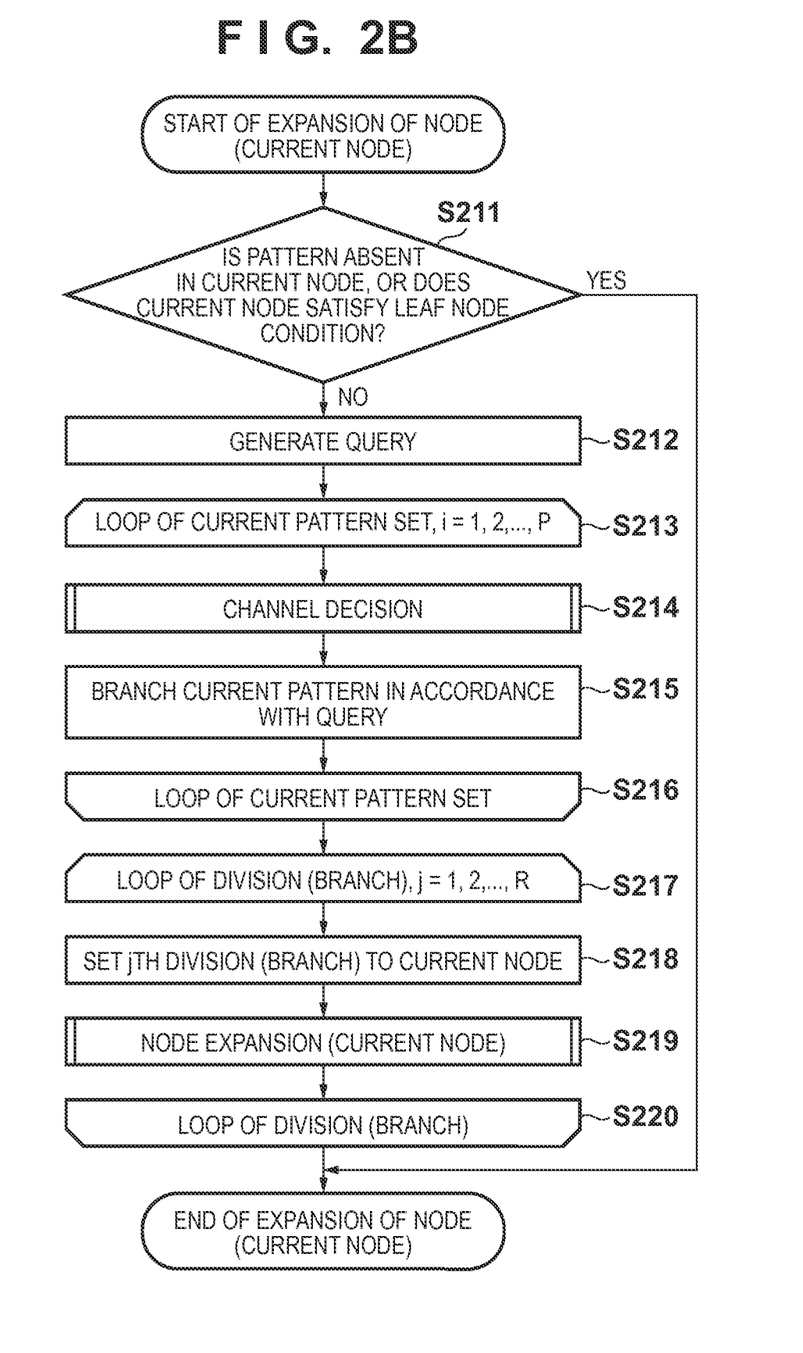
FIG. 2B is a flowchart showing details of processing of step S206.

Processing executed by the information processing apparatus (CPU 102) in the learning process will be described next with reference to FIG. 2A showing the flowchart of the processing. In the learning process, processing shown in FIG. 2B is recursively invoked during processing shown in FIG. 2A, thereby recursively dividing a learning pattern set to be described later and generating a tree structure.

In step S201, learning data is read out from the input/output device 104 or the external storage device 101 to the memory 103. The learning data indicates an image group (learning images) prepared for each channel. That is, a plurality of sets of images (sets of learning images) obtained by sensing a recognition target by different channels are acquired.

An example of the learning data will be described with reference to FIG. 3. Learning data 300 includes two channels: a luminance channel 301 and a range channel 302. A learning luminance image group 303 formed from luminance images (learning luminance images) each including the recognition target exists in the luminance channel 301. A learning range image group 304 formed from range images (learning range images) each including the recognition target exists in the range channel 302. When the learning images are images sensed from N different viewpoints, the learning data includes N learning luminance images and N learning range images, and the total number of images is 2×N.

Figure 3:
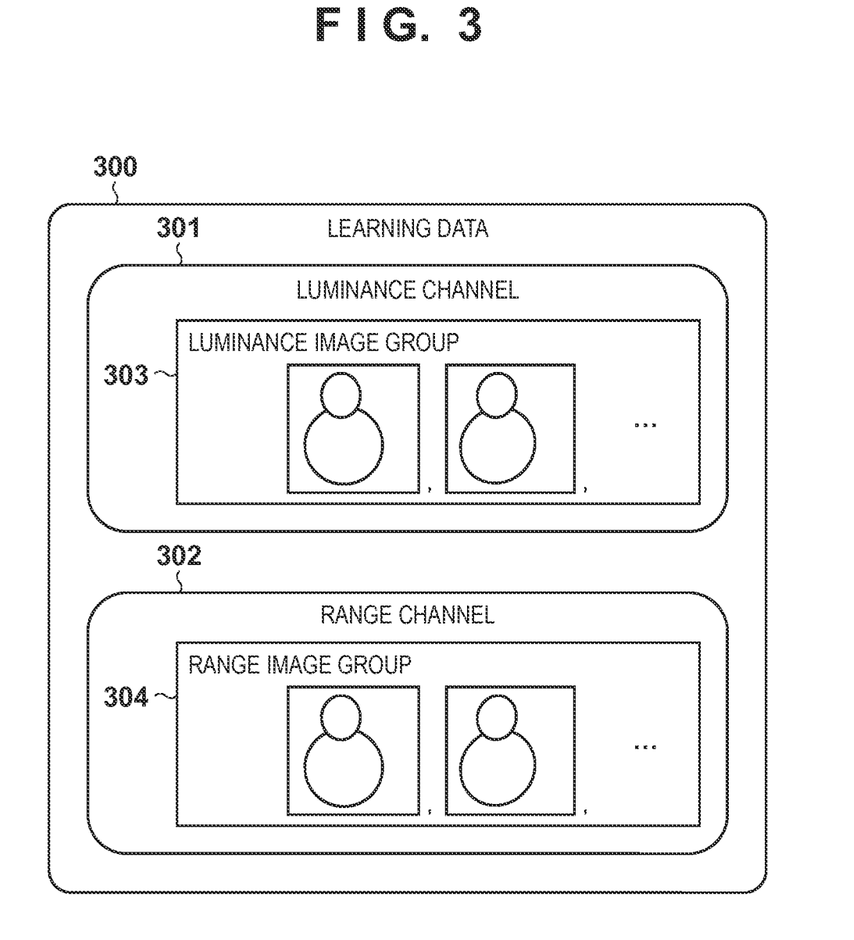
FIG. 3 is a view showing an example of learning data.

In FIG. 3, the image at the left end out of the images of the luminance channel 301 and the image at the left end of the images of the range channel 302 are obtained by sensing the same recognition target as a luminance image and a range image, though the types of images are different. This also applies to the second and subsequent images from the left. That is, the learning data includes a plurality of sets of images obtained by sensing the recognition target by different channels.

In the learning process, the learning images existing in each channel are given class (pattern type) names, and so-called "supervised learning" is performed. The learning luminance images may undergo preprocessing such as edge extraction to reduce the influence of an illumination variation and the like.

Referring back to FIG. 2A, in step S202, learning patterns are generated from the input learning data. Details of the processing of step S202 will be described with reference to the schematic view of FIG. 4.

In this embodiment, the learning patterns are generated by extracting M partial images from each learning luminance image and each learning range image. Note that the partial images are obtained by extracting regions at the same position in the learning images of each channel. It is desired that the partial images are extracted from the original images comprehensively so as to overlap each other. Each of N images shown in FIG. 4 as the learning images can be considered to be formed from the images (luminance image and range image) of the respective channels shown in FIG. 3. That is, M partial images are formed for the same class (learning image), and each channel has M×N partial images as a final partial image group.

Figure 4:
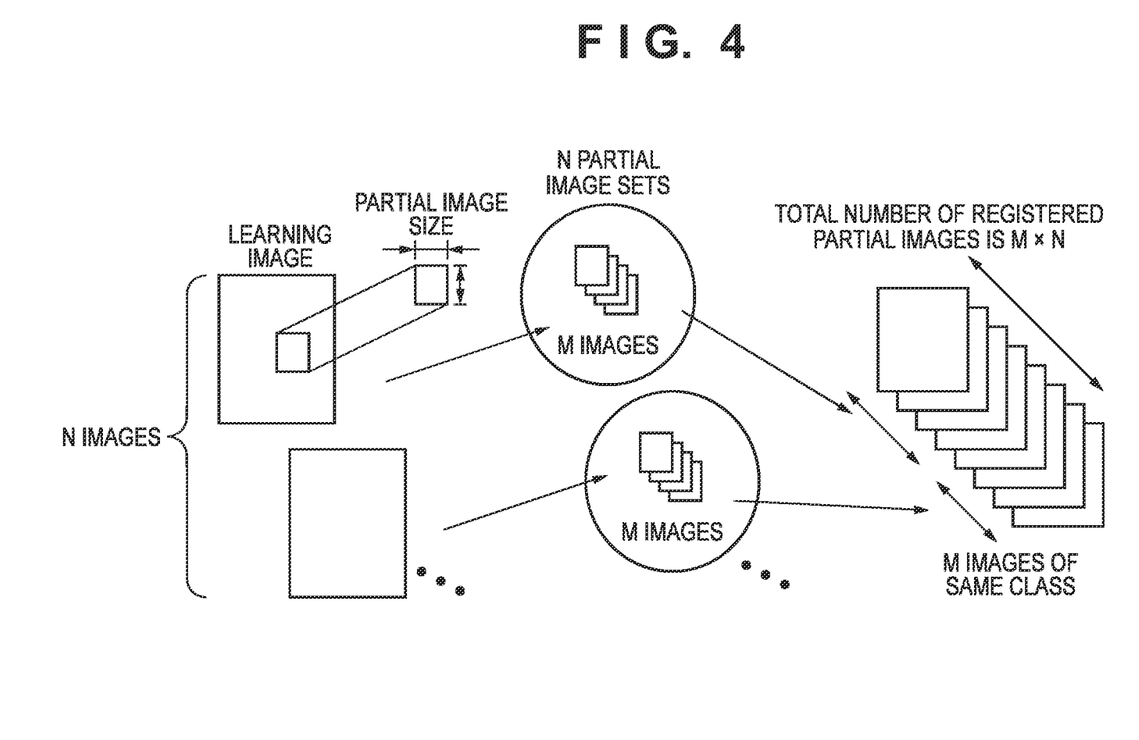
FIG. 4 is a schematic view showing processing of step S202.

In other words, in each of the image sets (N sets) obtained by sensing the recognition target by different channels, images in partial regions (M regions) of the images (two images) of the respective channels included in the image set are acquired as partial images. N partial image sets are thus obtained for each channel.

In the learning process, a classification tree that registers the M×N partial images as learning patterns and classifies them is generated. Instead of classifying all partial images ((2×M×N) partial images for two channels) of all channels, a channel to be used to determine branch is selected for each set of partial images at each node of the classification tree. This makes it possible to classify the learning patterns without increasing the number of tree structures even when the number of channels increases. Note that different preprocesses may be performed for the respective channels of the learning data to accurately perform classification.

Figure 5:
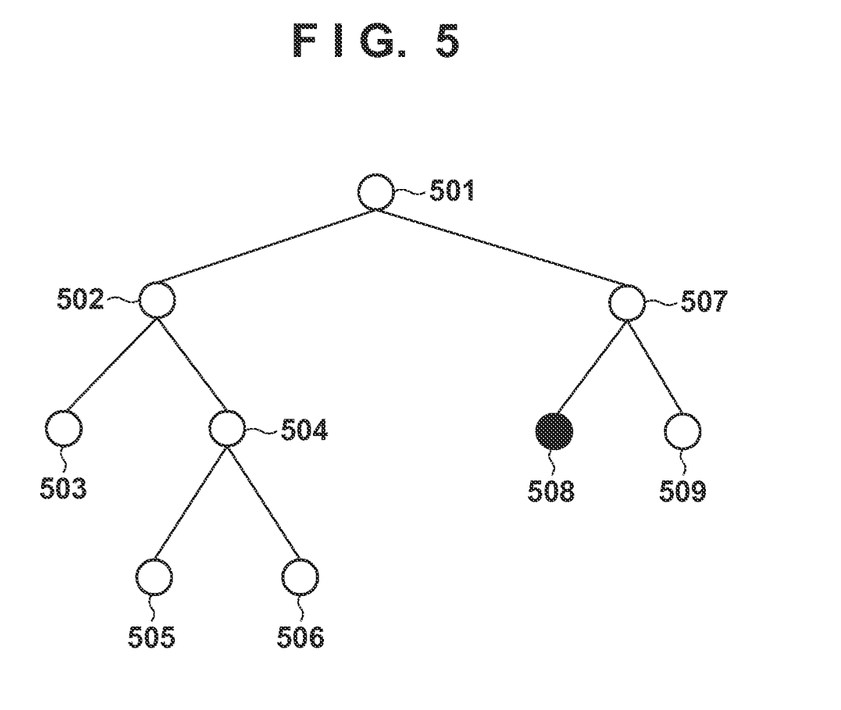
FIG. 5 is a view showing an example of a tree structure.

In the loop of steps S203 to S207, L tree structures to classify the learning patterns created in step S202 are generated. L is an arbitrary constant of 2 or more and is desired to have a number from 10 to 100 approximately. When L is large, the dictionary size is large, but the recognition ratio is improved. On the other hand, when L is small, the dictionary is compact, but the recognition ratio lowers. FIG. 5 shows an example of a created tree structure. The learning patterns are classified by sequentially tracking from a root node 501 to a lower node.

In step S204, all learning patterns are assigned (stored) to the root node (root node 501 in FIG. 5) of the tree structure. In the example shown in FIG. 4, the sets of the M partial images ((2×M×N) partial images) extracted from each of the N learning luminance images and the N learning range images are assigned to the root node of the tree structure.

Note that in the following explanation, "assigned to a node" indicates "associated with a node". Note that when an image assigned to a node A is assigned to a node B, the association with the node A is canceled, and the image is associated with the node B.

In step S205, the root node is set as a current node. The current node indicates a node currently under processing in the learning process and the recognition process.

In step S206, the learning pattern set assigned to the current node is divided. In step S206, processing according to the flowchart shown in FIG. 2B is executed (by invoking a subroutine for expanding the current node). When the process returns from the subroutine, the tree structure creation ends. Referring to FIG. 5, the current node moves in the order of numbers 501 to 509. This processing is executed repetitively L times (multiple operations) to create L tree structures, and the learning process ends.

Details of processing of step S206 will be described here with reference to FIG. 2B showing the flowchart of the processing. The flowchart shown in FIG. 2B explains the subroutine of expanding a node.

In step S211, it is determined whether the current node is one of a null node and a leaf node or neither. Upon determining that the current node is one of a null node and a leaf node, the process advances to step S207 and then to step S204 to create the next tree structure.

When no learning pattern is assigned to the current node, this current node is defined as a null node. When a learning pattern set assigned to the current node satisfies a predetermined condition, this current node is defined as a leaf node. The predetermined condition can be, for example, a condition that "the number of types of classes existing in the current node is K (for example, K=10) or less (the number of learning patterns assigned to the current node is K or less)". When K=1 is set, this condition means that "the current node purely includes only one class".

In the example shown in FIG. 5, the nodes 503, 505, 506, 508, and 509 are leaf nodes, and the node 508 is a null node. In the flowchart of FIG. 2B, when the nodes 503, 505, 506, 508, and 509 are set as the current node, the determination in step S211 ends with "yes", and the subroutine ends. The null nodes and the leaf nodes are also called terminal nodes to which remaining learning pattern information is assigned. For example, if the purpose of pattern recognition is class determination, each terminal node is assigned the existence probability of a class. Note that if the condition of the leaf node is "the current node purely includes only one class", as described above, the number of the remaining class may be assigned as information. On the other hand, if the purpose of pattern recognition is so-called regression, each terminal node is assigned a certain estimated value or estimated vector.

Figure 6A:
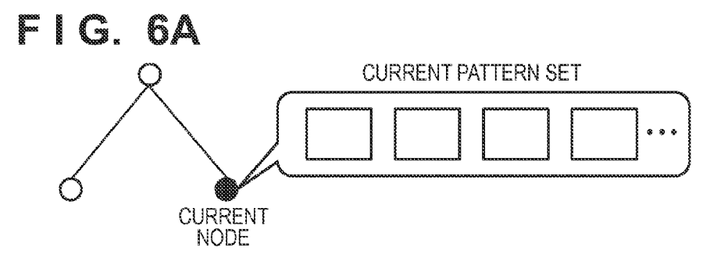
FIGS. 6A to 6D are schematic views showing processing in FIG. 2B.

On the other hand, if the current node is neither a null node nor a leaf node, the process advances to step S212. From step S212, the processing of the subroutine continues, and the learning patterns stored in the current node are divided into a plurality of child nodes. This processing is performed in steps S212 to S218. Out of these steps, in step S217, the subroutine shown in FIG. 2B is recursively invoked, and the learning pattern set is recursively divided. The schematic views of FIGS. 6A to 6D show the processing procedure. FIG. 6A shows the initial state in which the current node is not a terminal node. In this case, a plurality of partial image sets (sets each including the partial images of a learning luminance image and partial images at the same positions as those of the partial image in a learning range image of the same set as the learning luminance image) are assigned to the current node. A partial image of a learning range image in each partial image set assigned to the current node will be referred to as a current pattern hereinafter.

In step S212, a query point is selected to execute query before expansion of the current node. "Query" indicates an inquiry to determine which branch a certain pattern belongs to. The query of the current node is created using the set of current patterns (current pattern set) assigned to the current node.

Figure 6B:
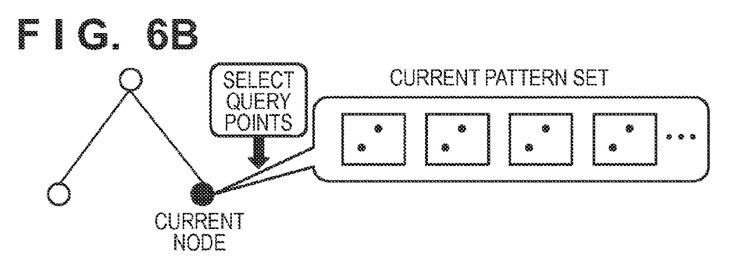

In this embodiment, the pixel values of two arbitrary points (query points) in a learning pattern of a channel c selected in step S214 to be described later are compared by the query. More specifically, letting $q(A, c)$ and $q(B, c)$ be the pixel values of query points A and B in the learning pattern of the channel c, query processing Q is represented by if $q(A, c) - q(B, c) > 0$ i→left node $Q(i, c) =$
else i→right node
i∈P|P: current pattern set In this case, query point selection executed in step S212 corresponds to an operation of selecting two arbitrary points in the current pattern. As shown in FIG. 6B, the query points are decided in each node. All current patterns assigned to a certain node undergo the query using the same query points. The positions of the query points can be decided at random in each node or decided by a method predetermined for each node.

As the query method, various methods other than the above-described method using expressions can be considered. For example, whether the pixel value difference between two points is equal to or larger or less than a predetermined value may be determined to decide i→left node (equal to or larger) or i→right node (smaller). Alternatively, not two points but n (n≥3) points may be selected, and whether the sum of the pixel values is equal to or larger than a predetermined value may be determined to decide i→left node (equal to or larger) or i→right node (smaller).

More generally, a plurality of points are selected. Branch can be done depending on whether a value of a function using the pixel values (vectors) of the plurality of points as inputs is equal to or larger than a predetermined value. Not pixel values but n-dimensional values in feature amounts (vectors) obtained by applying predetermined conversion to the input image may be compared.

In the loop of steps S213 to S216, a channel to perform query is decided for each current pattern and divided in accordance with the query. More specifically, processing of deciding a channel to perform query for the ith current pattern (i=1, 2, ..., P) out of P current patterns assigned to the current node and dividing the channel in accordance with the query is performed for i=1 to P.

In this embodiment, in the channel decision processing performed in step S214, determination is done by referring to the pixel values of the query points selected for the current node in step S212. The processing of the channel to be used for the query is executed by a subroutine shown in FIG. 7.

Figure 7:
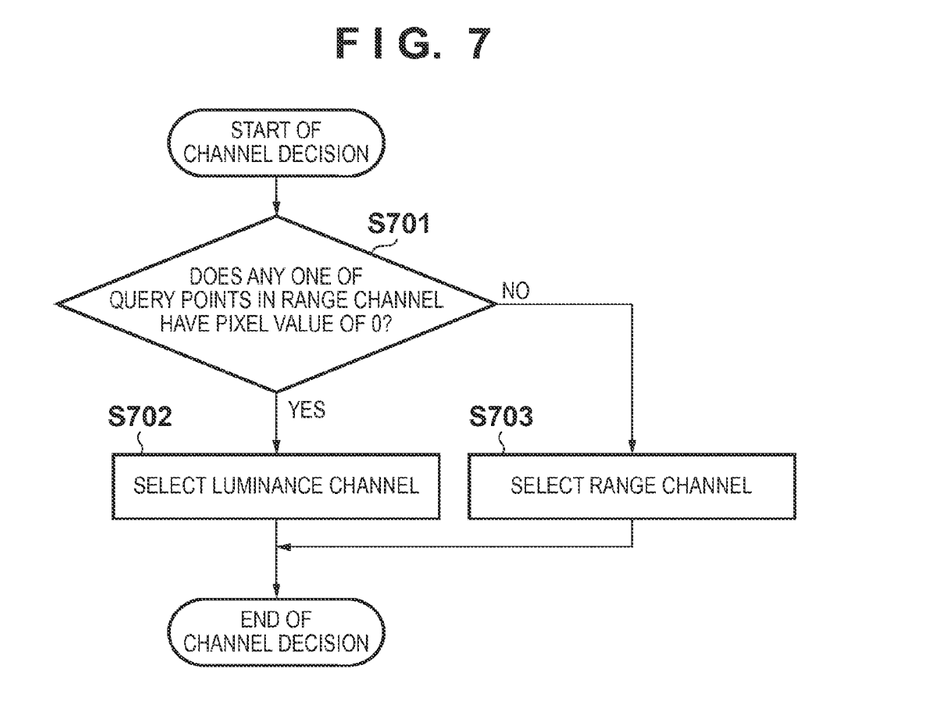
FIG. 7 is a flowchart showing details of processing of step S214.

In the subroutine (channel decision routine) shown in FIG. 7, it is necessary to select a channel that takes a combination of query points at which effective query can be performed. In this embodiment, identification is performed using the luminance channel and the range channel. In the range channel, if range image sensing is performed by, for example, the spatial encoding method, a region may occur where no pattern stripes are included, and distance measurement fails due to noise by external light or highlight/shadow detail loss. Using points on such a region for query should be avoided as much as possible. More generally, the following processing is performed. That is, a channel to be selected preferentially is decided in advance. If the values of query points in that channel are not correct (in this embodiment, if distance measurement has failed), the values of query points in the next channel to be preferentially selected is checked. This process is repeated, thereby deciding the channel.

In step S701, the pixel values of query points in the ith (i=1, 2, ..., P) current pattern (current pattern i) are referred to. It is determined whether a query point whose referred pixel value is 0 (in this embodiment, the pixel values of a measurement failure region are set to 0 being as invalid value) exists amount the query points. Upon determining that such a query point exists, the process advances to step S702. If such a point does not exist, the process advances to step S703.

Figure 8:
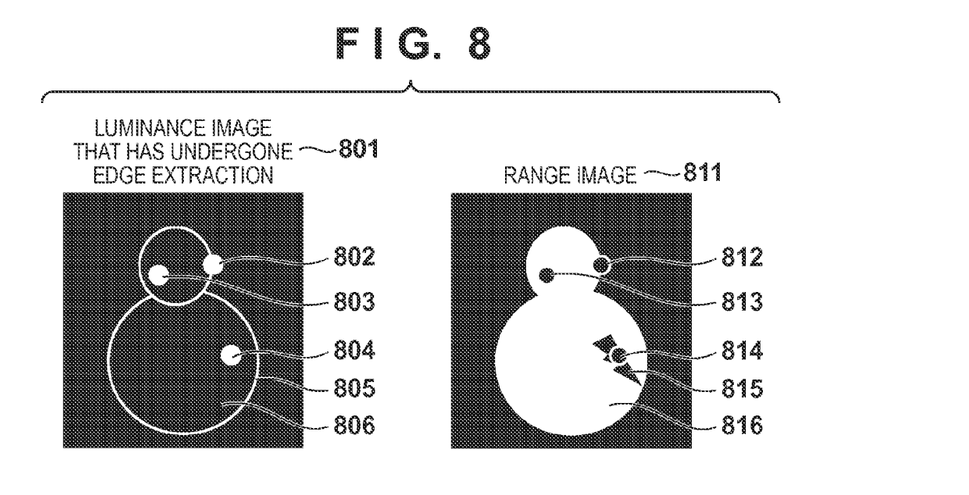
FIG. 8 is a view showing an example of channel selection.

In step S702, the luminance channel is selected as the channel to be used for query. On the other hand, in step S703, the range channel is selected as the channel to be used for query. FIG. 8 shows an example of channel selection in accordance with query.

When a point 812 and a point 813 in a range image 811 (corresponding to a point 802 and a point 803 in a luminance image 801) are selected as query points, neither the point 812 nor the point 813 has a pixel value of 0. In this case, the range channel is selected as the channel to perform query.

On the other hand, when the point 812 and a point 814 in the range image 811 (corresponding to the point 802 and a point 804 in the luminance image 801) are selected as query points, the point 814 has a pixel value of 0 (the point 814 is a point selected from a measurement failure region). In this case, the luminance channel is selected as the channel to perform query.

Note that the query points may set on the luminance image. In this case, the channel selection is similarly performed using pixel values on the range image corresponding to the set points.

Figure 6C:
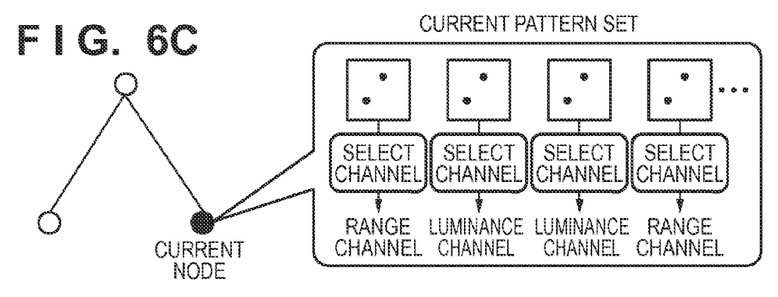

When the above-described channel selection is performed for each current pattern in the current node, the selected channel is associated with each current pattern, as shown in FIG. 6C.

Figure 6D:
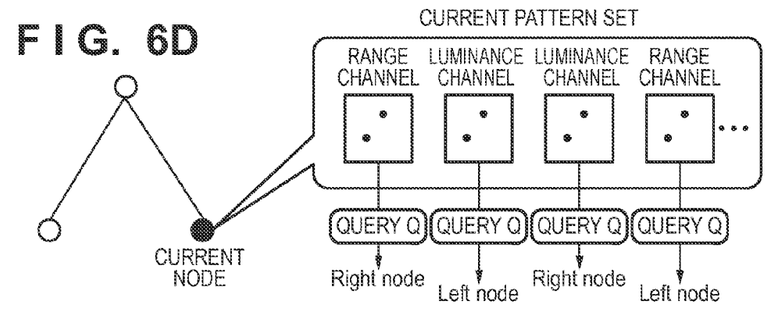

In step S215, for the partial image set i including the current pattern i, calculation is performed using the above-described expression for the learning pattern of the channel c selected in step S214, thereby obtaining Q(i, c), as shown in FIG. 6D. At this time, if left node is set in i, the left node is selected out of the nodes under (immediately under) the current node, and the partial image set i is assigned to the selected node. If right node is set in i, the right node is selected out of the nodes under (immediately under) the current node, and the partial image set i is assigned to the selected node.

In general, the number R of branches to the lower nodes may change depending on the current node. However, the same value is normally used in all nodes. The division is also called a branch. In this embodiment, the learning pattern is divided into two by the query Q. Hence, R=2, and a binary tree as shown in FIG. 5 is created.

For example, this will be described with reference to FIG. 8. As described above, when the points 812 and 813 in the range image 811 are selected as query points, neither the point 812 nor the point 813 has a pixel value of 0. For this reason, the range channel is selected as the channel to perform query. The pixel values of the points 812 and 813 are compared by the above-described expression. As a result, (pixel value of point 812)−(pixel value of point 813)=180−190=−10<0. Hence, the partial image set including the range image 811 and the luminance image 801 is assigned to the right node out of the nodes under (immediately under) the current node.

On the other hand, when the points 812 and 814 in the range image 811 are selected as query points, the point 814 has a pixel value of 0. For this reason, the luminance channel is selected as the channel to perform query. The pixel values of the points 802 and 804 are compared by the above-described expression. As a result, (pixel value of point 802)−(pixel value of point 804)=255−0=255>0. Hence, the partial image set including the range image 811 and the luminance image 801 is assigned to the left node out of the nodes under (immediately under) the current node.

In the above-described way, each partial image set in the current node is divided to one of the left node and the right node. This processing enables to perform high-quality query by selecting the channel to perform query for each current pattern in each node.

Steps S217 to S220 form a loop for each branch. In step S218, a branch j is set in the current node. In step S219, the subroutine in FIG. 2B is recursively invoked. In this embodiment, the number R of branches of each node in step S217 is 2, as described above.

With the above-described processing, in the learning process, a tree structure for classifying the partial regions of a learning image is generated. The data of the generated tree structure is stored in the memory 103, the external storage device 101, or the like. The storage destination is not limited to this, as a matter of course.

Note that the above-described processing of the learning process is an example of an arrangement to be described below. That is, an image acquisition method or an image acquisition situation is defined as a channel. A plurality of sets of images obtained by sensing the recognition target by different channels are acquired.

The image in a partial region of each image of each channel included in the image sets is acquired as a partial image, and the sets of the acquired partial images of the respective channels are assigned to the root node of the tree structure (first assignment).

When sequentially referring to the nodes of the tree structure from the root node to the end node, the set assigned to the currently referred node is defined as the current node. One of the different channels is selected using the pixel values of a plurality of pixels in the partial images of a predetermined channel in the current set.

The partial image of the selected channel out of the partial images in the current set is set to the target partial image. A node corresponding to the pixel values of a plurality of pixels in the target partial image is selected out of the nodes under the currently referred node, and the current set is assigned to the selected node (second assignment).

After the assignment by the first assignment and the second assignment, information about the set assigned to the end node of the tree structure is assigned to the end node, and the tree structure is output.

Processing of identifying the recognition target using the tree structure will be described next. In the identification process, input images as many as the channels are received as inputs. In this embodiment, the learning is performed for the luminance channel and the range channel. For this reason, two images, that is, the luminance image and the range image are received as the images input in the identification process.

Partial images are extracted from these input images. Identification is performed for each partial image (identification pattern) using a plurality of tree structures created in the learning process. The identification results of all tree structures are finally totaled and output as the final result. Note that "identification" using each tree structure indicates here selecting a class learned in the learning process, which is most similar to the input identification pattern. As a characteristic feature, a channel to be used in each node when subjecting the identification pattern to a tree structure is decided, and branching is done using only the identification pattern of a channel that changes depending on the node.

Figure 9A:
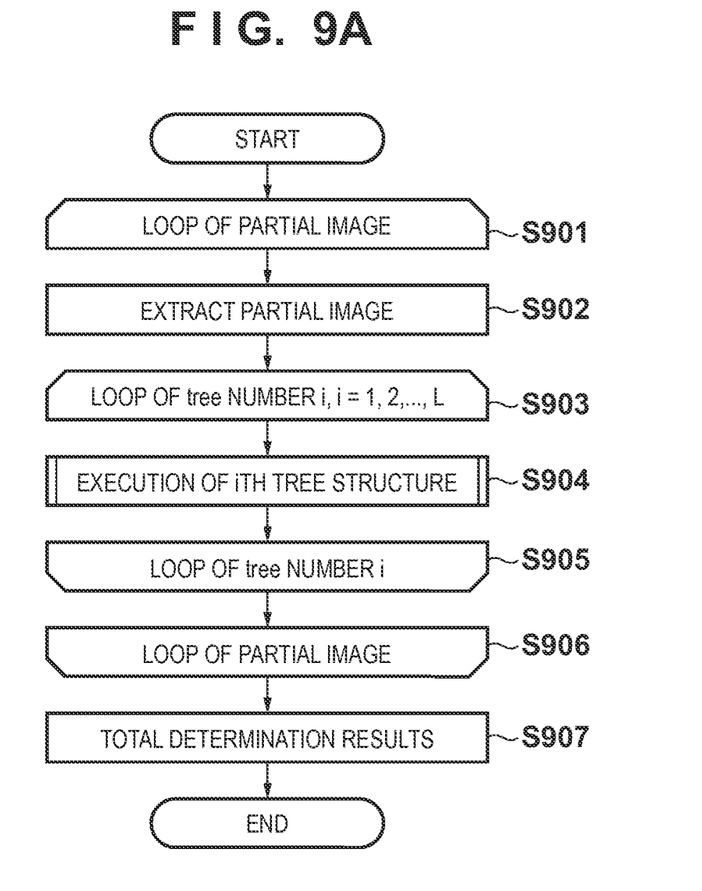
FIG. 9A is a flowchart of processing of an identification process.

Processing performed by the information processing apparatus (CPU 102) in the identification process will be described with reference to FIG. 9A showing the flowchart of the processing. Note that the processing of the identification process may be performed by an apparatus other than the apparatus (in this embodiment, the information processing apparatus shown in FIG. 1) that has performed the processing of the learning process. In that case, the information processing apparatus shown in FIG. 1 needs to send the data of the tree structure to the apparatus that performs the processing of the identification process.

The loop of steps S901 to S906 is repetitively performed as many times as the number of partial images extracted from each of the luminance image and the range image input for the identification. That is, when M partial images are extracted from each of the luminance image and the range image, the loop of steps S901 to S906 is repeated M times.

In step S902, one partial image is extracted from each of the luminance image and the range image input for the identification as an identification pattern, as in step S202 described above. The size of the identification pattern is the same as that of the learning pattern. The partial images are extracted from the entire images (the luminance image and the range image) so as to overlap each other. The identification patterns are desired to be extracted from the input images as tightly as possible from the viewpoint of accuracy. However, since the loop of steps S901 to S906 is performed as many times as the number of identification patterns, tradeoff for the execution time needs to be taken into consideration.

Figure 9B:
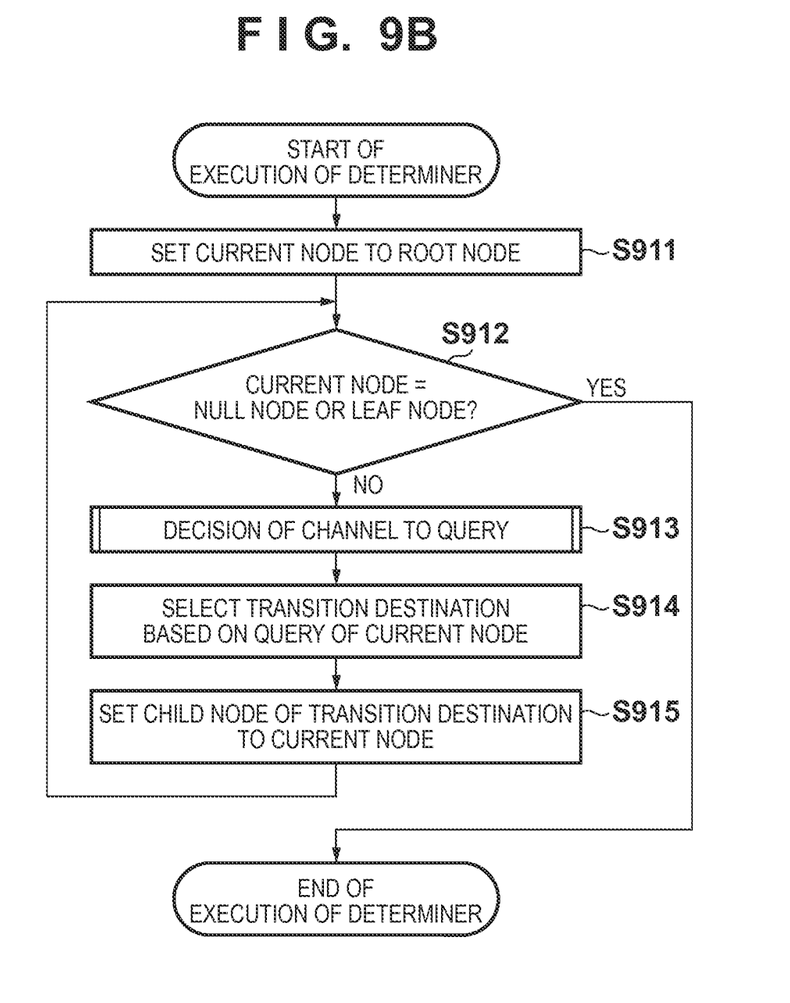
FIG. 9B is a flowchart showing details of processing of step S904.

In the loop of steps S903 to S905, the L tree structures created in the learning process are sequentially applied to the identification patterns extracted in step S902, and a leaf node at which the identification patterns arrive is specified for each of the L tree structures. This processing is performed in step S904. That is, the processing of step S904 using the ith tree structure of the L tree structures created in the learning process is performed for i=1 to L. Details of the processing of step S904 will be described with reference to FIG. 9B showing the flowchart of the processing.

In step S911, the root node of the ith tree structure is set to the current node.

In step S912, it is determined whether the current node is one of a null node and a leaf node or neither. Upon determining that the current node is one of a null node and a leaf node, the process advances to step S905, and the processing of step S904 is performed using the (i+1)th tree structure.

On the other hand, if the current node is neither a null node nor a leaf node, the process advances to step S913. In step S913, processing according to the flowchart shown in FIG. 7 is performed using the identification pattern of the range channel out of the identification patterns extracted in step S902. The channel whose identification patterns should be used in the subsequent processing out of the identification patterns extracted in step S902 can thus be selected.

Channel decision is performed as in the learning process in the above-described way, thereby obtaining the following effects. That is, even if the information of the channel to be used for query is not described in the dictionary, when an identification pattern belonging to the same class as the learning pattern is input in the identification process, the same channel as that of the learning pattern is selected, and the query can correctly be performed.

In step S914, one of the nodes (right node and left node) immediately under the current node is selected using the identification pattern of the channel selected in step S913 out of the identification patterns extracted in step S902. The selection method is the same (the method using the expressions) as in the learning process.

In step S915, the node (child node) selected in step S914 is set as the current node, and the process returns to step S912. In the flowchart shown in FIG. 9B, the tree structure is tracked from the root node to the null node or leaf node.

When the loop of steps S901 to S906 has ended, L identification results (pieces of information obtained for the L tree structures and assigned to the leaf nodes at which the identification patterns have arrived) are obtained for each identification pattern extracted in step S902.

In step S907, the identification results are totaled, and one learning image is finally output as the recognition target identification result for the input image. The totaling method is not limited to a specific method, and any method is usable. For example, calculation processing such as geometric mean or arithmetic mean may be performed for the existence probabilities of the L classes obtained for each identification pattern obtained in step S902, and a learning image closest to the result may be output. Alternatively, the existence position of the learning image may the obtained by voting using an offset that records the position of a partial image in the learning image.

Note that the processing of the above-described identification process is an example of an arrangement to be described below. More specifically, an input image set obtained by sensing a target by different channels is acquired. Images in partial regions of the input images of the respective channels included in the input image set are acquired as input partial images.

One of the different channels is selected using the pixel values of a plurality of pixels in the input partial images of a predetermined channel out of the input partial images of the respective channels. The input partial image of the selected channel out of the input partial images of the respective channels is set to the target input partial image.

When sequentially referring to the nodes of the tree structure from the root node to the end node, a node corresponding to the pixel values of a plurality of pixels in the target input partial image is selected as the node to be referred to next out of the nodes under the currently referred node. If the currently referred node is the end node of the tree structure, the identification result of the input image set is decided from the information assigned to the end node.

[Second Embodiment]

This embodiment is the same as the first embodiment except the processing of the channel decision routine shown in FIGS. 2B and 9B. Since the rest of the processing is the same as in the first embodiment, the channel decision routine will be described below with reference to FIG. 10.

Figure 10:
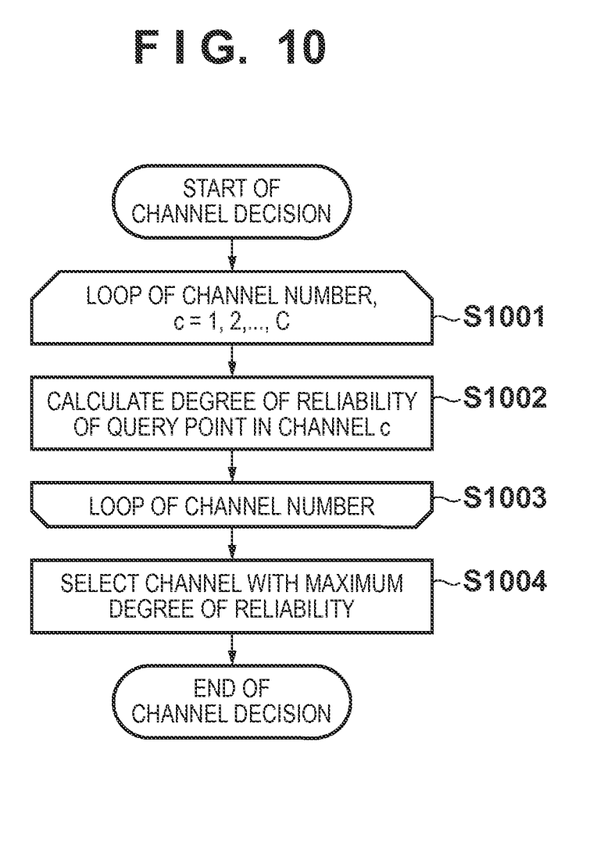
FIG. 10 is a flowchart of a channel decision routine.

The loop of steps S1001 to S1003 is repeated as many times as the number C of channels. Since two channels are used in this embodiment as well, C=2. In this case, the processing of steps S1002 and S1003 is performed for c=1, 2.

In step S1002, the pixel value of a query point in the partial image of a channel c is referred to. The degree of reliability for the query point is calculated from the pixel value of the referred query point. The degree of reliability is an index representing whether the query point in the current node of each channel is useful for query. The degree of reliability can arbitrarily be calculated. The calculation method may be changed depending on the channel. In general, the degree of reliability is set to take on a large vale in correspondence with a combination of query points that enable effective query. In a luminance image that has undergone edge extraction processing as preprocessing, when query is performed for points having a large pixel value difference, the query points are effective. Conversely, if regions without an edge are selected as query points, both points have a pixel value of 0 and cannot be effective query points.

In this embodiment, the pixel value difference between the query points in the luminance image is defined as the degree of reliability of query in the luminance channel. For a range image, the degree of reliability should be set low because if a point in a region where measurement has failed is selected as a query point, query using the channel may cause a division error, as described in the first embodiment. In this embodiment, when the pixel value of one of the query points is 0, the degree of reliability is 0. However, in this embodiment as well, the pixel value in a region where measurement has failed is set to 0, as in the first embodiment.

When acquiring the range data by the stereo method or the spatial encoding method, the error tends to be large near an edge of an object where the distance abruptly changes. Alternatively, the irradiation pattern in the spatial encoding method may be disturbed by multiple reflection of objects, and erroneous range information may be acquired. To prevent this, the degree of reliability may be set low in a region where a large distance variation occurs within a predetermined range. In this embodiment, the variance of the pixel values of the query points and the peripheral region is used as the value of the degree of reliability.

At the point of time the process has advanced to step S1004, the degree of reliability is high for each partial image of the channel c. Hence, in step S1004, the channel for which the maximum degree of reliability has been obtained is selected. Note that if the degree of reliability of a certain channel is equal to or more than a threshold, the channel may be used, and if the degree of reliability is less than the threshold, another channel may be used.

[Third Embodiment]

In this embodiment, learning/identification using a fern structure (M. Ozuysal, et al., "Fast Keypoint Recognition using Random Ferns", IEEE Transactions on PAMI, Vol. 32, Nr. 3, pp. 448-461, 2010) in place of a tree structure will be described.

The input data and the overall processing procedure are the same as in the first embodiment or the known fern structure. Hence, a description of the detailed processing procedure will be omitted, and processing of the fern structure (determiner) unique to this embodiment will be explained.

In learning using a tree structure, a learning pattern is divided into different child nodes based on the division result in each node, thereby classifying the learning pattern. In addition, query used to determine division changes between the nodes. In learning using a fern structure, query is predetermined for each depth. The result of query at each depth is recorded for each learning pattern, thereby classifying the learning pattern.

Figure 11:
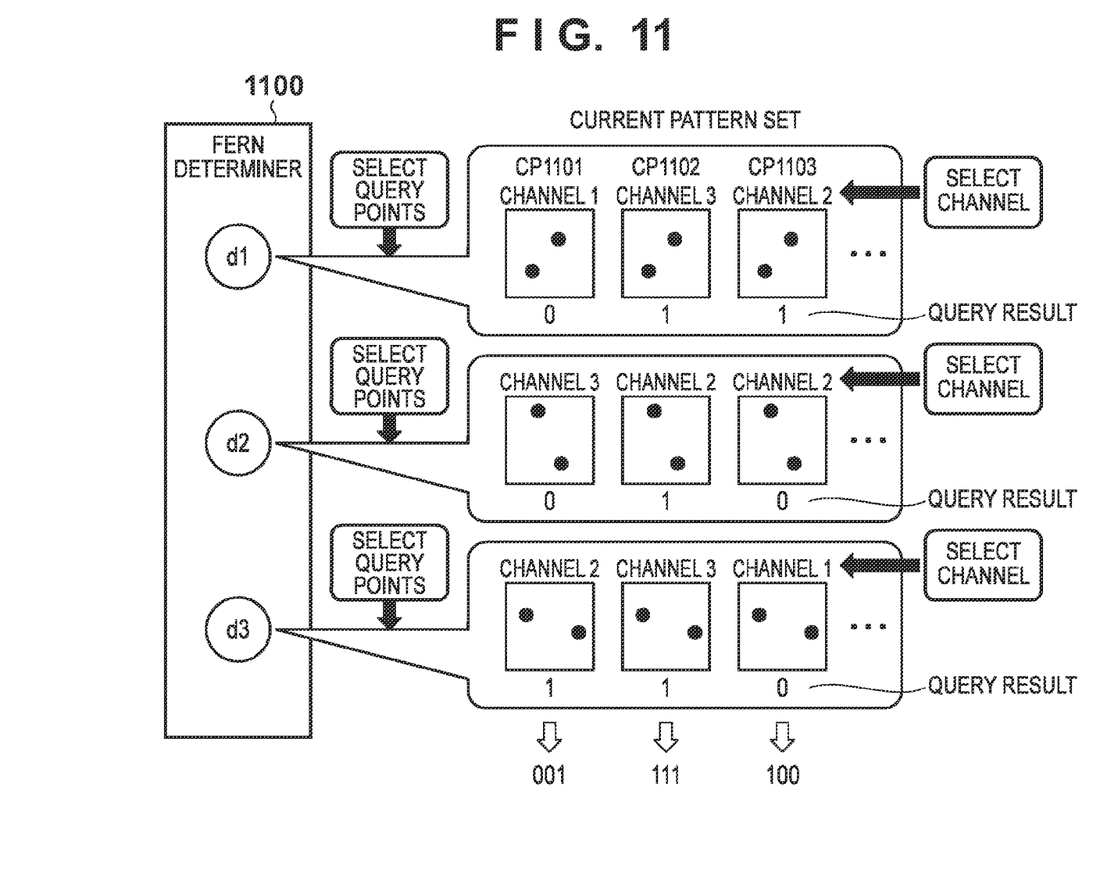
FIG. 11 is a view for explaining processing of a fern structure.

Processing of the fern structure according to this embodiment will be described with reference to FIG. 11. Note that in this embodiment, the query is done by comparing the pixel values of two arbitrary points (query points) of a current pattern in a selected channel c, as in the first embodiment. That is, letting $q(A, c)$ and $q(B, c)$ be the pixel values of query points A and B in the learning pattern of the channel c, query processing Q is represented by if $q(A, c)-q(B, c)>0$ $Q(i, c)=1$
else $Q(i, c)=0$
i∈P|P: current pattern set FIG. 11 shows a fern determiner 1100 having three steps of depth. As in the first embodiment, the learning pattern is first classified by query of a first depth d1. At this time, an appropriate channel is selected based on the pixel values of the query points in each channel for each current pattern. Although the learning is performed using three types of channels in FIG. 11, channel selection can be done by comparing a degree of reliability predetermined in accordance with the channel, as in the processing shown in FIG. 10.

In FIG. 11, as the result of channel selection, channel 1 is selected for a current pattern CP 1101, and the pattern is classified to "0" by the query of the depth d1. For a current pattern CP 1102, channel 3 is selected, and the pattern is classified to "1". For a current pattern CP 1103, channel 2 is selected, and the pattern is classified to "1". In the queries of depths d2 and d3 as well, channel selection and classification by query are performed for all learning patterns. The classification results of all queries are finally totaled to obtain the classification result of the learning pattern. For example, the classification result of the current pattern CP 1101 in FIG. 11 is "001". Similarly, the current pattern CP 1102 is classified as "111", and the current pattern CP 1103 is classified as "100".

Note that although a 3-stage fern structure has been described here for the sake of simplicity, 10 or more depths are desired to be prepared in actuality.

A detailed description of the operation of the fern structure in the identification process will be omitted. As in the learning process, channel selection and classification by query are performed for each pattern of the identification pattern set at each depth. The results of all queries are totaled to obtain the classification result of the identification pattern. The result of channel selection performed at the time of learning is not reflected at the time of identification. However, the channel selection is performed based on the same kind of criterion. For this reason, if an identification pattern similar to a learning pattern is input, the same channel selection result is obtained. Hence, an appropriate channel is selected in both the learning process and the identification process.

[Other Embodiments]

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-096036 filed Apr. 19, 2012 which is hereby incorporated by reference herein in its entirety.

What is claimed is:

1. An information processing apparatus comprising;
   an acquisition unit that acquires a plurality of image sets obtained by different acquisition methods;
   a generation unit that generates partial image sets by extracting corresponding partial images from respective images of the image. sets;
   a first assignment unit that assigns the partial image sets generated by said generation unit to a root node of a tree structure;
   a setting unit that sets, at each node of the tree structure, positions of a plurality of pixels for each partial image set assigned to the node;
   a determination unit that determines whether any one of the plurality of pixels in a partial image obtained by a predetermined one of the different aquisition methods in each partial image set has an invalid value;
   a selection unit that selects the predetermined one of the different acquisition methods for the partial image set when none of the plurality of pixels in the partial image obtained, by the predetermined one of the different acquisition methods has the invalid value and selects another one of the diff different acquisition methods for the partial image set when at least one of the plurality of pixels in the partial image obtained by the predetermined one of the different acquisition methods has the invalid value;
   a second assignment unit that assigns each partial image set assigned to each node to one of lower nodes based on the pixel values of the set positions in the partial images acquired by the acquisition method selected by said selection unit; and
   an output unit that outputs information about the set assigned to an end node of the tree structure.

2. The apparatus according to claim 1, wherein said acquisition unit defines a luminance image and a range image as images obtained by the different acquisition methods and acquires a plurality of image sets each including one of the luminance images and one of the range images.

3. The apparatus according to claim 2, wherein said setting unit sets positions of two pixels for each set of the partial image of the luminance image and the partial image of the range image, said determination unit determines whether any one of the two pixels in the partial image of the range image in each set has the invalid value, and said selection unit selects a luminance image in a set when at least one of the two pixels for the set has the invalid value, and selects the range image in the set when neither of the two pixels has the invalid value.

4. The apparatus according to claim 2, wherein said selection unit sets positions of two pixels for each set of the luminance image and the range image, obtains a degree of reliability for the partial image of the luminance image in each set using pixel values of the two pixels in the partial image of the luminance image, obtains a degree of reliability for the partial image of the range image in the set using the pixel values of the two pixels in the partial image of the range image, and selects one of the luminance image and the range image from the obtained degrees of reliability.

5. The apparatus according to claim 1, further comprising a unit that causes said first assignment unit, said selection unit, and said second assignment unit to operate a. plurality of times to generate a plurality of tree structures.

6. The apparatus according to claim 1, further comprising:
   a unit that acquires an input image set obtained by the different acquisition methods and acquires an image in a partial region of each input image of the input image set as an input partial image;
   a unit that selects one. of the different acquisition methods using the pixel values of the plurality of pixels in each input partial image and sets the input partial image of the selected acquisition method out of the respective input partial images to a target input partial image;
   a unit that selects, in each node of the tree structure a node corresponding to the pixel values of the plurality of pixels in the target input partial image as a next node to be referred to out of nodes under a currently referred node; and
   a decision unit that, if the currently referred node is an end node of the tree structure, decides an identification result of the input image set from information assigned to the end node.

7. The apparatus according to claim 1, wherein the positions of the plurality of pixels change between nodes.

8. An information processing method performed by an information processing apparatus, the method comprising:
   an acquisition step of acquiring a plurality of image sets obtained by different acquisition methods:
   a generation. step of generating partial image sets by extracting corresponding partial images from respective images of the image sets;
   a first assignment step of assigning the partial image sets generated in the generation step to a root node of a tree structure;
   a setting step of setting, at each node of the tree structure, positions of a plurality of pixels for each partial image set assigned to the node;

a determination step of determining whether any one of the plurality of pixels in a partial image obtained by a predetermined one of the different acquisition methods in each partial image set has an invalid value;

a selection step of selecting the predetermined one of the different acquisition methods for the partial image set when none of the plurality of pixels in the partial image obtained by the predetermined one of different acquisition methods has the invalid value, and selecting another one of the different acquisition methods for the partial image set when at least one of the plurality of pixels in the partial image obtained by the predetermined one of the different acquisition methods has the invalid value;

a second assignment step of assigning each partial image set assigned to each node to one of lower nodes based on the pixel values of the set positions in the partial images acquired by the acquisition method selected in the selection step; and an output step of outputting information about the set assigned to an end node of the tree structure.

9. A non-transitory my computer-readable storage medium storing a computer program for causing a computer to function as each unit of an information processing apparatus of claim 1.

* * * * *